United States Patent
Hama et al.

(10) Patent No.: US 10,126,935 B2
(45) Date of Patent: Nov. 13, 2018

(54) TERMINAL APPARATUS, BIOMETRIC AUTHENTICATION METHOD, AND COMPUTER-READABLE STORAGE MEDIUM

(71) Applicant: FUJITSU LIMITED, Kawasaki-shi, Kanagawa (JP)

(72) Inventors: Soichi Hama, Atsugi (JP); Yukihiro Abiko, Kawasaki (JP); Satoshi Maeda, Atsugi (JP); Satoshi Semba, Kawasaki (JP); Hajime Nada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 206 days.

(21) Appl. No.: 15/064,855

(22) Filed: Mar. 9, 2016

(65) Prior Publication Data

US 2016/0275334 A1    Sep. 22, 2016

(30) Foreign Application Priority Data

Mar. 16, 2015 (JP) ................................. 2015-052491

(51) Int. Cl.
*G06K 9/00* (2006.01)
*G06F 3/0488* (2013.01)
*G06F 21/32* (2013.01)

(52) U.S. Cl.
CPC ............ *G06F 3/0488* (2013.01); *G06F 21/32* (2013.01); *G06K 9/00013* (2013.01); *G06K 2009/00932* (2013.01)

(58) Field of Classification Search
CPC .... G06F 3/0488; G06F 21/32; G06F 9/00013; G06F 9/0002; G06F 9/00087;
(Continued)

(56) References Cited

U.S. PATENT DOCUMENTS 5,852,670 A * 12/1998 Setlak .................. G06K 9/0002
382/126
8,064,645 B1 * 11/2011 Sezille ............... G06K 9/00013
382/115
(Continued)

FOREIGN PATENT DOCUMENTS

EP         2830002 A2    1/2015
JP     2002-024831 A    1/2002
(Continued)

OTHER PUBLICATIONS

Machine Translation of Japanese Patent document, JP 2007 122164 A (Hitachi Ltd) May 17, 2007.*
(Continued)

*Primary Examiner* — Shanto Abedin
(74) *Attorney, Agent, or Firm* — Fujitsu Patent Center

(57) ABSTRACT

A terminal apparatus includes an information input device that detects a coordinate value of an input operation position touched by a user, a biometric sensor that captures a capture area of a palm of the user at a time of an input operation to the information input device, to generate biometric data, and a processor. The processor performs a process including matching the biometric data to a corresponding portion of registered biometric data registered in advance and read based on the coordinate value, to compute a similarity of the biometric data to the corresponding portion.

16 Claims, 11 Drawing Sheets

(58) Field of Classification Search
CPC ... G06F 9/00067; H04W 12/04; H04W 12/02; H04W 12/08; H04L 9/3247; H04L 63/0435; H04L 63/06; H04L 63/164; H04L 63/0428
USPC .............................. 726/18; 713/186; 382/115
See application file for complete search history.

(56) References Cited

U.S. PATENT DOCUMENTS

| | | | | |
|---|---|---|---|---|
| 8,085,992 | B1* | 12/2011 | Sahin | G06K 9/00087 382/115 |
| 8,385,613 | B2* | 2/2013 | Cervantes | G06K 9/00087 382/115 |
| 8,538,090 | B2* | 9/2013 | Ishii | G06F 3/0425 382/104 |
| 2002/0003892 | A1 | 1/2002 | Iwanaga | |
| 2009/0123041 | A1* | 5/2009 | Tani | G06K 9/00013 382/126 |
| 2010/0226539 | A1 | 9/2010 | Ishii | |
| 2011/0194776 | A1* | 8/2011 | Nakamura | A61B 5/117 382/195 |
| 2011/0243396 | A1* | 10/2011 | Hama | A61B 5/117 382/115 |
| 2012/0188056 | A1* | 7/2012 | Sahin | G06K 9/00006 340/5.82 |
| 2013/0027184 | A1* | 1/2013 | Endoh | G06K 9/00013 340/5.83 |
| 2013/0251213 | A1 | 9/2013 | Nada et al. | |
| 2014/0298450 | A1* | 10/2014 | Lymberopoulos | G06F 21/32 726/19 |
| 2015/0010215 | A1* | 1/2015 | Fukuda | G06K 9/00013 382/115 |

FOREIGN PATENT DOCUMENTS

| | | |
|---|---|---|
| JP | 2007-122164 A | 5/2007 |
| JP | 2010-202029 A | 9/2010 |
| JP | 2013-200673 A | 10/2013 |

OTHER PUBLICATIONS

Extended European Search Report dated Jul. 5, 2016 for corresponding European Patent Application No. 16159126.8, 5 pages.

* cited by examiner

FIG.1
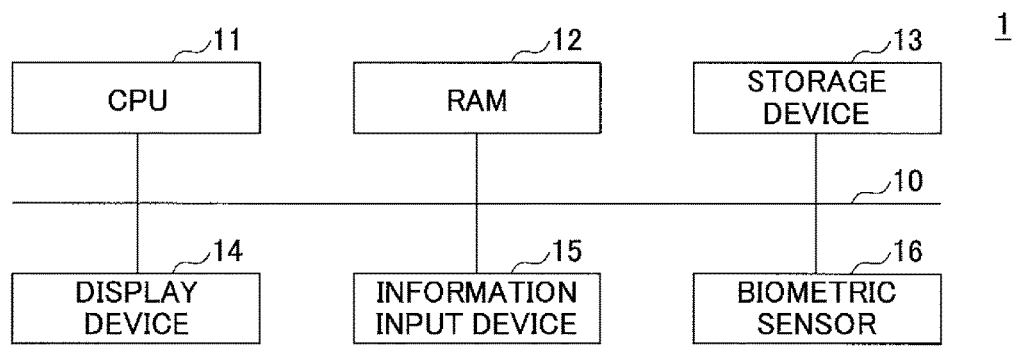
FIG.2A FIG.2B
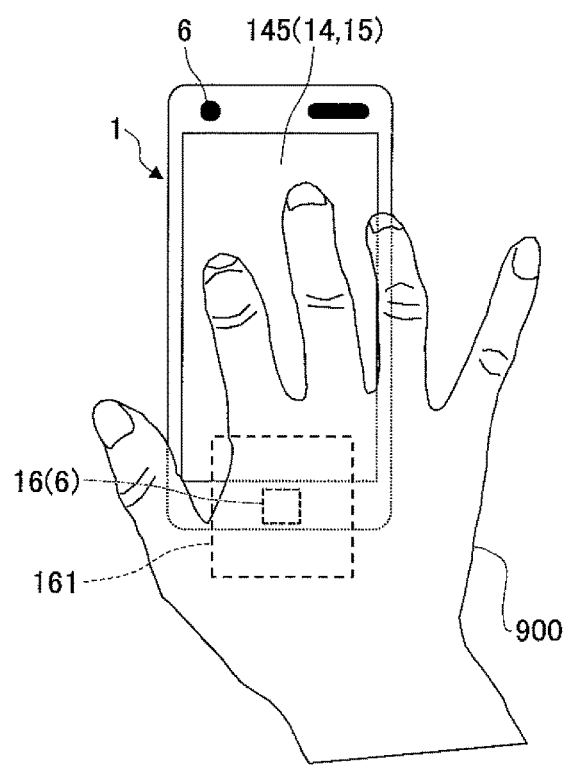 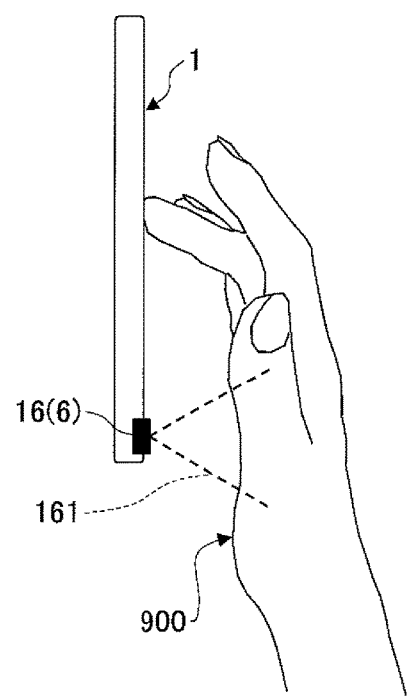

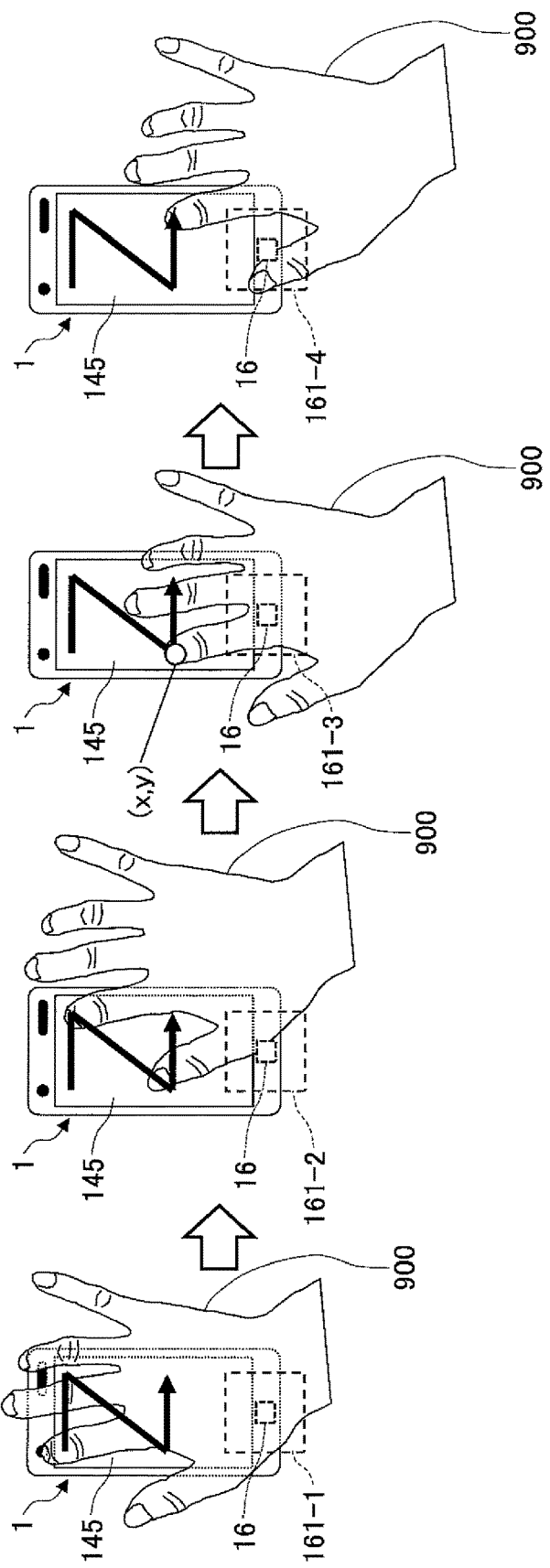

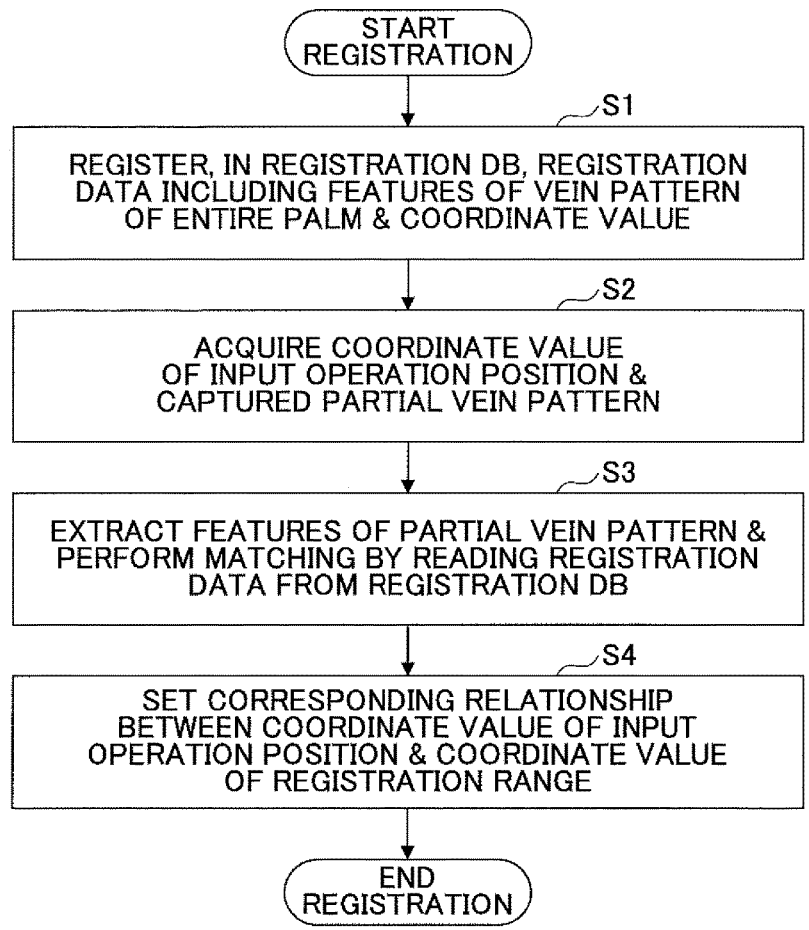
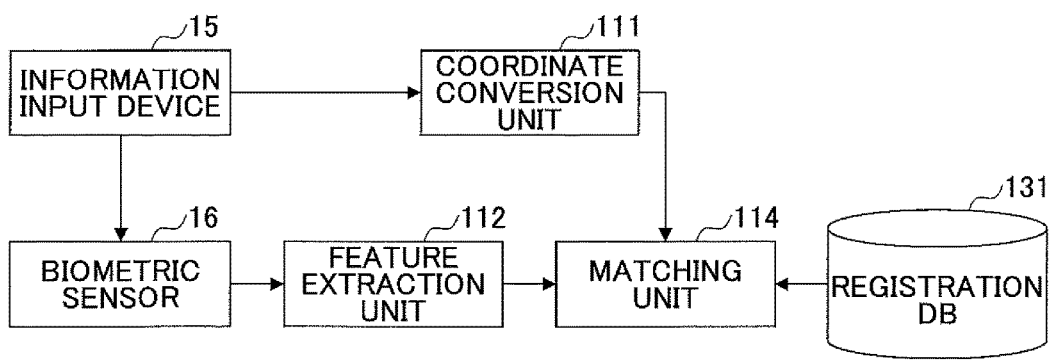

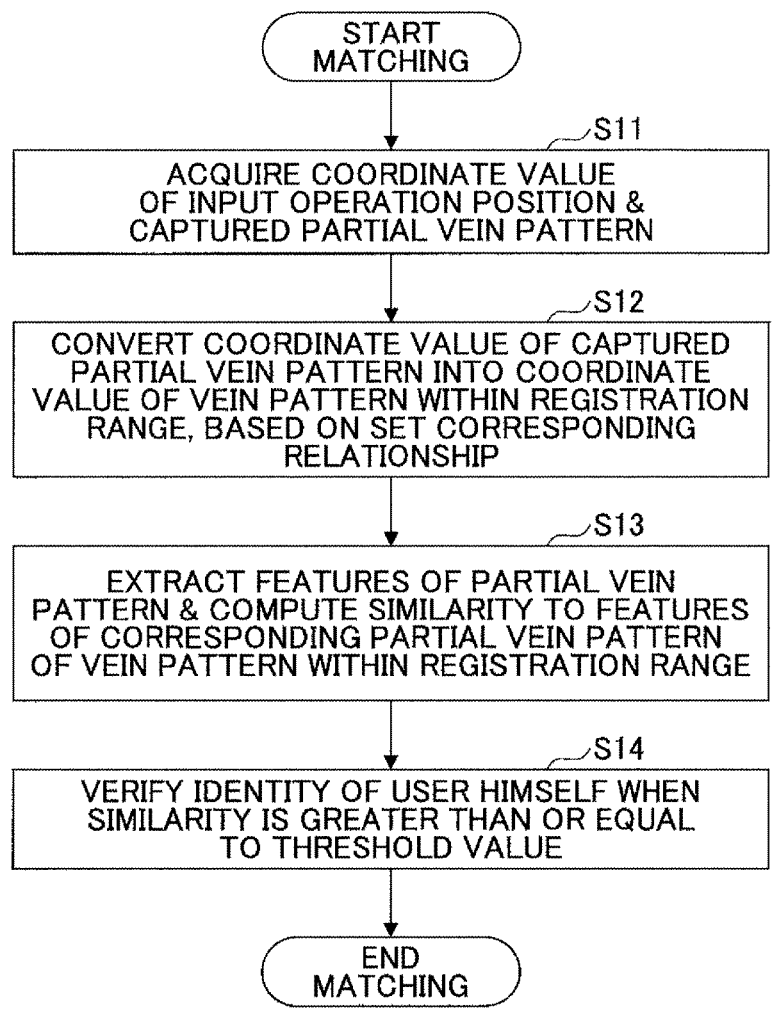

TERMINAL APPARATUS, BIOMETRIC AUTHENTICATION METHOD, AND COMPUTER-READABLE STORAGE MEDIUM

CROSS-REFERENCE TO RELATED APPLICATIONS

This application is based upon and claims the benefit of priority of the prior Japanese Patent Application No. 2015-052491, filed on Mar. 16, 2015, the entire contents of which are incorporated herein by reference.

FIELD

The embodiments discussed herein are related to a terminal apparatus, a biometric authentication method, and a computer-readable storage medium.

BACKGROUND

Biometric authentication is a technique to perform identity verification using features (hereinafter also referred to as "biometric features") of biometric information, such as fingerprint, face, vein, or the like. The biometric authentication matches biometric features (hereinafter also referred to as "registered biometric features") that are registered in advance to biometric features that are acquired when confirmation is required, in order to perform the identity verification based on whether the acquired biometric features match the registered biometric features.

Terminal apparatuses, such as a tablet terminal or the like, provided with a biometric authentication function, include a terminal apparatus that performs a palm vein authentication. When acquiring vein information for the palm vein authentication, it is desirable to capture the palm from a position slightly separated from the terminal apparatus, so that the entire palm can be captured. However, when the terminal apparatus is held by one hand to capture the palm of the other hand, a position of a region of the palm that is captured becomes unstable, and the authentication failing rate increases even though the identity verification is performed on the person himself (that is, FRR (False Rejection Rate) increases).

When the hand holding the terminal apparatus is captured in a state in which the terminal apparatus is held by the hand, the position of the region of the palm that is captured stabilizes. However, in this case, a distance between the palm and the terminal apparatus becomes short. For this reason, only a portion of the palm can be captured, and it is difficult to capture the entire palm. In addition, the position where the terminal apparatus is held by the hand is not necessarily always constant. Accordingly, a so-called partial authentication may be performed by registering the features of the vein information (hereinafter also referred to as "vein pattern") of the entire palm, capturing only a portion of the vein pattern at a time of matching, and partially matching the features of the captured vein pattern to the registered features of the corresponding portion of the vein pattern of the entire palm.

The partial authentication is a technique used in fingerprint authentication, for example. For example, Japanese Laid-Open Patent Publication No. 2002-024831 proposes the partial authentication used in the fingerprint authentication. The partial authentication used in the fingerprint authentication determines the position of a fingerprint portion captured using a center of a whorl of the fingerprint as a reference with respect to the entire fingerprint, and performs the partial matching to the corresponding fingerprint portion of the registered fingerprint. Hence, the position of the captured fingerprint portion can be determined with ease, and the partial matching of the fingerprint can be performed at a high speed with a high accuracy.

On the other hand, in the case of the vein authentication, the vein pattern of a portion of the captured palm does not include information, such as the whorl of the fingerprint, that may be used as a reference for the position with respect to the entire palm. For this reason, in a case in which the partial authentication is applied to the vein authentication, it is conceivable to determine the position of the vein pattern of the portion of the captured palm with respect to the entire palm, and perform the partial matching of the features to a corresponding portion of the registered vein pattern. However, in the partial authentication using the vein pattern of the portion of the captured palm, there are cases in which position information, such as contours of fingers and palm, is not included in the captured information. In such cases, it is difficult to determine the position of the vein pattern of the portion of the captured palm with respect to the entire palm. Consequently, the vein pattern of the entire palm must be scanned by the vein pattern of the portion of the captured palm, to find a matching position and perform the partial matching to the features of the corresponding portion of the registered vein pattern. As a result, it takes time to scan the vein pattern of the entire palm, and a time required to perform the matching process increases. In addition, there is a possibility that the features of the vein pattern of one portion of the captured palm of a user match by chance to features of one portion of a vein pattern of the entire palm of a different user.

Accordingly, it is conventionally difficult to perform a vein authentication at a high speed in a case in which the partial authentication is applied to the vein authentication.

Other related art includes Japanese Laid-Open Patent Publications No. 2010-202029 and No. 2013-200673, for example.

SUMMARY

Accordingly, it is an object in one aspect of the embodiments to provide a terminal apparatus, a biometric authentication method, and a computer-readable storage medium which can perform a vein authentication at a high speed in a case in which the partial authentication is applied to the vein authentication.

According to one aspect of the embodiments, a terminal apparatus includes an information input device that detects a coordinate value of an input operation position touched by a user; a biometric sensor that captures a capture area of a palm of the user at a time of an input operation to the information input device, to generate biometric data; and a processor that performs a process including matching the biometric data to a corresponding portion of registered biometric data registered in advance and read based on the coordinate value, to compute a similarity of the biometric data to the corresponding portion.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a block diagram illustrating an example of a hardware configuration of a terminal apparatus in one embodiment;

FIGS. 2A and 2B are diagrams for explaining an example of an operating state of the terminal apparatus;

FIG. 3 is a diagram for explaining an example of the operating state of the terminal apparatus;

FIG. 7 is a flow chart for explaining the operation of the terminal apparatus in the first embodiment at the time of registering the vein pattern;

FIG. 8 is a functional block diagram for explaining an operation of the terminal apparatus in the first embodiment at a time of matching vein patterns;

FIG. 9 is a flow chart for explaining the operation of the terminal apparatus in the first embodiment at the time of matching the vein patterns;

DESCRIPTION OF EMBODIMENTS

Figure 4:
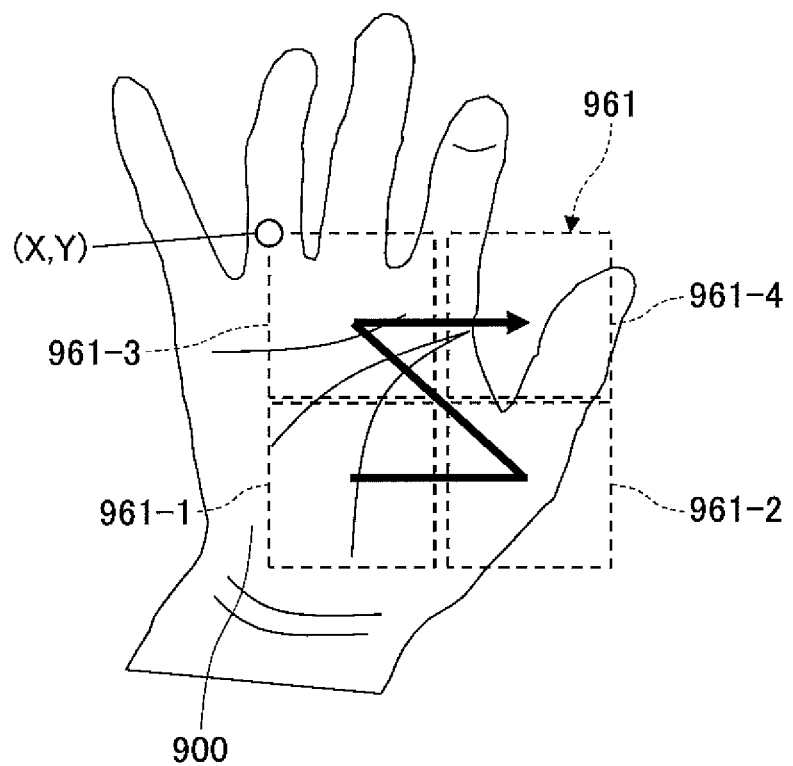
FIG. 4 is a diagram for explaining an example of a registered vein pattern.

Preferred embodiments of the present invention will be described with reference to the accompanying drawings.

A description will now be given of a terminal apparatus, a biometric authentication method, and a computer-readable storage medium in each embodiment according to the present invention.

According to the terminal apparatus, the biometric authentication method, and the computer-readable storage medium disclosed herein, an information input device detects a coordinate value of an input operation position touched by a user. A biometric sensor captures a capture area of a palm of the user at a time of an input operation to the information input device, to generate biometric data. A processor or a matching unit matches the biometric data to a corresponding portion of registered biometric data registered in advance and read based on the coordinate value, to compute a similarity of the biometric data to the corresponding portion. Identify verification of the user is performed based on the similarity.

FIG. 1 is a block diagram illustrating an example of a hardware configuration of the terminal apparatus in one embodiment. A terminal apparatus 1 illustrated in FIG. 1 may be a portable terminal, such as a cellular telephone, a smart phone, a tablet, or the like, for example. The terminal apparatus 1 includes a CPU (Central Processing Unit) 11, a RAM (Random Access Memory) 12, a storage device 13, a display device 14, an information input device 15, and a biometric sensor 16 that are connected via a bus 10.

The CPU 11 is an example of a processor (or computer) that controls the operation of the entire terminal apparatus 1. The RAM 12 and the storage device 13 are examples of a storage, storage means, or non-transitory computer-readable storage medium. The storage device 13 stores a registration database, a biometric authentication program to be executed by the CPU 11, or the like, for example. As will be described later, registration data including coordinate values, features, or the like of a vein pattern are registered in the registration database. The vein pattern is an example of biometric information of the entire palm of a user. The biometric authentication program may cause the CPU 11 to execute a registration process according to a biometric authentication method illustrated in FIG. 7 or FIGS. 11 and 12, or to execute a matching process according to a biometric authentication method illustrated in FIG. 9 or FIGS. 13 and 14. The biometric authentication program may be read from the storage device 13 and stored in the RAM 12 when the CPU 11 executes the biometric authentication program. The RAM 12 stores various kinds of data, including coefficients and parameters used by the biometric authentication program, intermediate results of operations executed by the CPU 11, or the like.

The display device 14 displays messages or the like with resect to the user of the terminal apparatus 1, including an authentication result, for example. The information input device 15 is operated by the user to input information, such as numerical values, characters, figures, commands, or the like, for example, to the terminal apparatus 1. The display device 14 and the information input device 15 may be included in a touchscreen panel provided with both a display function an information input function. The information input device 15 is not limited to a particular device as long as the information input device 15 can detect an input operation and output a coordinate value of an input operation position. For example, a track pad, a keyboard, a digitizer, a ten-key, or the like may be used for the information input device 15. The biometric sensor 16 may be a camera, for example.

The terminal apparatus 1 is of course not limited to the configuration illustrated in FIG. 1 in which the constituent elements are connected via the bus 10.

FIGS. 2A and 2B are diagrams for explaining an example of an operating state of the terminal apparatus. FIG. 2A is a plan view of the terminal apparatus 1, and FIG. 2B is a side view of the terminal apparatus 1. In this example, the terminal apparatus 1 has a touchscreen panel 145 integrally including the display device 14 and the information input device 15. As illustrated in FIGS. 2A and 2B, the user can input information to the terminal apparatus 1 by operating the touchscreen panel 145 by the user's finger. The touchscreen panel 145 has a known function to input a coordinate value of a position (hereinafter also referred to as "touched position") on the touchscreen panel 145 touched by the user's finger, and to convert the coordinate value into information such as a character or the like. The biometric sensor 16 is provided at a position capable of capturing at least a portion of the user's palm 900 when the user operates the touchscreen panel 145 by the user's finger. The biometric sensor 16 may be one of a plurality of cameras 6 provided on the terminal apparatus 1.

When the user performs an input operation by sliding the user's finger on the touchscreen panel 145 to draw a pattern, or by touching a key, a button, an icon, or the like displayed on the touchscreen panel 145 to input a numerical value, a character, a figure, or the like, the biometric sensor 16 captures the user's palm 900 simultaneously as the detection of the input operation (that is, touch) to the touchscreen panel 145. In this example, the biometric sensor 16 captures a vein pattern of the user's palm 900, which is an example of the biometric information. In this state, a relative positional relationship is uniquely determined between the touch position on the touchscreen panel 145 touched by the user's finger and the position of the biometric sensor 16. In other words, the touchscreen panel 145 (or the information input device 15) and the biometric sensor 16 are arranged at relative positions such that the biometric sensor 16 captures at least a portion of the user's palm 900 when the user operates the touchscreen panel 145 (or the information input device 15) by the user's finger. In addition, a capture area 161 captured by the biometric sensor 16 is determined by an angle of view of the biometric sensor 16 and a distance between the user's palm 900 and the terminal apparatus 1. For this reason, in a case in which the same user operates the terminal apparatus 1, the capture area 161 of the user's palm 900 captured by the biometric sensor 16 is approximately constant, and the position of the capture area 161 on the user's palm 900 that is captured corresponds to the touch position on the touchscreen panel 145.

FIG. 3 is a diagram for explaining an example of the operating state of the terminal apparatus. For example, in a case in which the biometric sensor 16 captures the vein pattern of the user's palm 900 simultaneously as when the user continuously slides the user's finger on the touchscreen panel 145 as illustrated in FIG. 3, an area of the vein pattern that is captured is determined for each touch position. For this reason, it is possible to determine the position of the vein pattern captured by the biometric sensor 16 with respect to the entire user's palm 900, using the touch position as a reference. The identity verification of the user can be performed by partial matching of the features of the captured vein pattern and features of the corresponding portion of the registered vein pattern, according to the position of the captured vein pattern. The touch positions in the case in which the user continuously slides the user's finger on the touchscreen panel 145 may be positions where the user's finger sliding on the touchscreen panel 145 stops for a predetermined time or longer, positions sampled at predetermined sampling times or intervals while the user's finger slides on the touchscreen panel 145, or positions after the user's finger slides a predetermined distance on the touchscreen panel 145.

In the example illustrated in FIG. 3, the user draws a Z-shaped pattern by sliding the user's finger on the touchscreen panel 145, however, a ten-key, for example, may be displayed on the touchscreen panel 145. In this case, when the user operates the ten-key and inputs a numerical value, the biometric sensor 16 captures the vein pattern at a time when the user's finger touches the ten-key corresponding to the numerical value. The touch position in this case is the position of the ten-key operated by the user.

FIG. 4 is a diagram for explaining an example of a registered vein pattern. FIG. 4 is a view of the user's palm 900 viewed from an opposite side (that is, from the side of the terminal apparatus 1) from the view illustrated in FIG. 3.

A registration area 961 that captures the entire user's palm 900 at the time of registering the vein pattern includes four areas 961-1 through 961-4 that correspond to capture areas 161-1 through 161-4 captured by the biometric sensor 16 at the four touch positions illustrated in FIG. 3 at the time of matching the vein patterns in this example. In other words, the registration area 961 is a region larger than each capture area 161 (each of the capture areas 161-1 through 161-4 in the example illustrated in FIG. 3). When the user slides the user's finger on the touchscreen panel 145 and draws the Z-shaped pattern as indicated by a bold solid arrow in FIG. 3, the positions of captured images of the capture areas 161-1 through 161-4 captured by the biometric sensor 16 respectively correspond to the positions of the areas 961-1 through 961-4 of the captured image within the registration area 961 as illustrated by a bold solid arrow in FIG. 4. In FIG. 4, a coordinate value (X, Y) that becomes a reference for the registration area 961 corresponds to a coordinate value (x, y) of the touch position on the touchscreen panel 145 illustrated in FIG. 3. Accordingly, the vein pattern of the registration area 961 captured by the biometric sensor 16 may be used as a template. When matching the vein pattern of the capture area 161 captured by the biometric sensor 16 at the time of the biometric authentication to the registration data, this vein pattern may be compared with the template.

In the example described above, the biometric sensor 16 captures the vein pattern at a plurality of touch positions, and performs the partial matching of the features to each corresponding portion of the registered vein pattern using each touch position as the reference. However, the vein pattern may be captured at a single touch position, and the partial matching of the features may be performed to the corresponding portion of the registered vein pattern using the single touch position as the reference. The features of a larger number of vein patterns can be utilized and the authentication accuracy can be improved, in the case in which the vein pattern is captured at the plurality of touch positions and the partial matching of the features is performed to each corresponding portion of the registered vein pattern using each touch position as the reference.

(First Embodiment)

Figure 5:
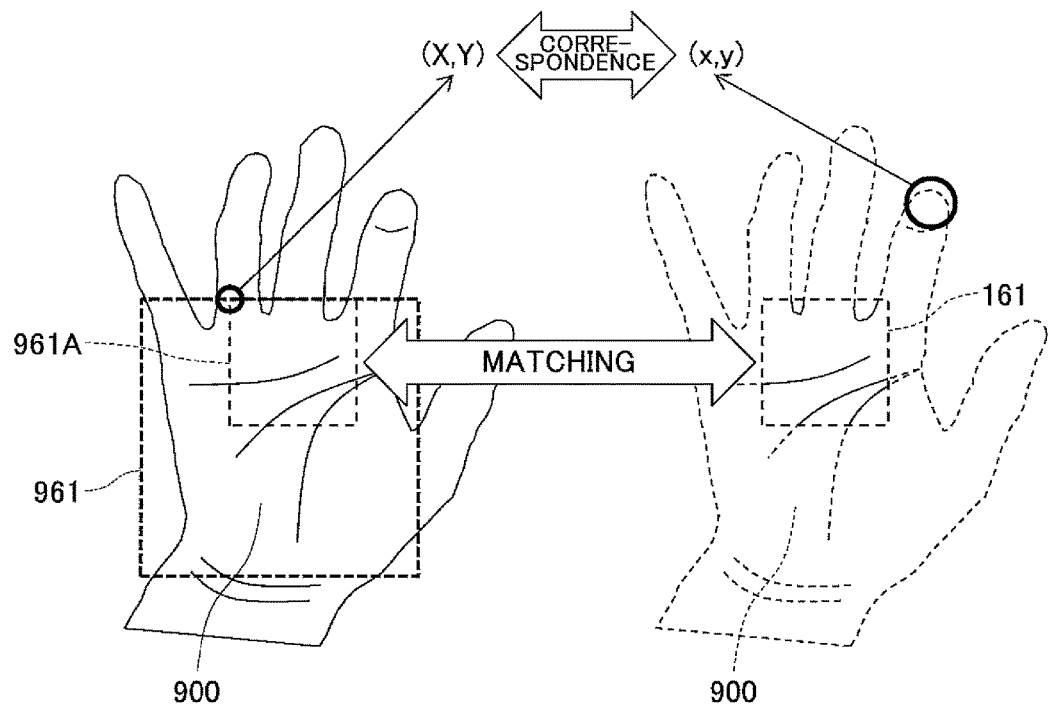
FIG. 5 is a diagram for explaining an example of a relationship between a coordinate value of an input operation position on an information input device and a coordinate value of a captured image captured by a biometric sensor.

FIG. 5 is a diagram for explaining an example of a relationship between the coordinate value of the input operation position on the information input device and the coordinate value of the captured image captured by the biometric sensor. FIG. 5 is a view of the user's palm 900 viewed from the side of the terminal apparatus 1, similarly as in the case illustrated in FIG. 4. In this example, as illustrated in FIG. 5, a positioning (or alignment) is performed in advance using a coordinate system of the image of the entire user's palm 900 as a reference. First, the biometric sensor 16 captures the registration area 961 surrounded by a dotted line on the left side of FIG. 5, in order to capture the image of the entire user's palm 900. For example, by placing the user's palm 900 at a position separated by a predetermined distance or more from the terminal apparatus 1, it is possible to obtain a visual field covering the entire user's palm 900 and capture the entire user's palm 900 by the biometric sensor 16. In addition, the image of the entire user's palm 900 may be captured using the camera 6 that is different from the biometric sensor 16. Furthermore, the image of the entire user's palm 900 may be captured by an apparatus other than the terminal apparatus 1, and in this case, the vein pattern of the captured registration area 961 is provided from outside the terminal apparatus 1.

Next, in order to register the vein pattern, the capture area 161 is captured by the biometric sensor while the user makes an input operation on the information input device 15, so as to capture the vein pattern of a portion of the user's palm 900. As a result, the coordinate value of the input operation position at a point in time when the user performs the input operation on the information input device 15, and the captured image of the capture area 161 captured by the biometric sensor 16 at this point in time, are obtained. In this case, position information that indicates which portion of the registration area 961, corresponding to the captured image of the entire user's palm 900, corresponds to the captured image of the capture area 161 surrounded by a dotted line on the right side of FIG. 5, is determined by a known pattern matching. This pattern matching is a process in which the registration area 961 corresponding to the captured image of the entire user's palm 900 is scanned by the partial image of the vein pattern that is obtained at the point in time when the input operation is being performed, and the position having a highest correlation is obtained. In the example illustrated in FIG. 5, when the registration area 961 is scanned by the captured image of the capture area 161, it is found that a position 961A, for example, has the highest correlation. It is preferable not to perform such a process at the time of matching the vein patterns, because such a process requires a long processing time to perform. However, at the time of registering the vein pattern, it is a precondition that the captured image of the entire user's palm 900 captured within the registration area 961 and the partial image captured within the capture area 161 both relate to the image of the user himself. In other words, at the time of registering the vein pattern, there is no possibility of erroneously registering a vein pattern of a person other than the user himself. In addition, because the vein pattern only needs to be registered at least once prior to matching the vein patterns, it is possible to tolerate the process which requires the long processing time to perform when registering the vein pattern.

In FIG. 5, it is found from the pattern matching described above that the partial image of the capture area 161 captured by the biometric sensor 16 at the point in time when the coordinate value of the input operation position on the information input device 15 is (x, y), corresponds to the partial image of the position 961A within the registration area 961. Hence, it is found that the coordinate value (x, y) of the input operation position on the information input device 15 corresponds to the coordinate value (X, Y) that is used as the reference of the registration area 961. The coordinate value (X, Y) that is used as the reference of the registration area 961 is the coordinate value of the position 961A within the registration area 961. Accordingly, when the coordinate value (x, y) of the input operation position on the information input device 15 is detected, it is found from the corresponding relationship of the coordinate value (x, y) and the coordinate value (X, Y) that the captured image of the capture area 161 captured by the biometric sensor 16 at this point in time corresponds to the position 961A within the registration area 961. Thus, the coordinate system of the captured image of the capture area 161 can be converted into the coordinate system within the registration area 961.

In addition, when performing the pattern matching, the captured image of the capture area 161 may be enlarged or reduced if necessary, before converting the coordinate system of the captured image of the capture area 161 into the coordinate system of the registration area 961. Of course, when performing the pattern matching, the captured image of the registration area 961 may be enlarged or reduced, before converting the coordinate system of the captured image of the capture area 161 into the coordinate system of the registration area 961. In other words, when performing the pattern matching, at least one of the captured image of the capture area 161 and the captured image of the registration area 961 may be enlarged or reduced, before converting the coordinate system of the captured image of the capture area 161 into the coordinate system of the registration area 961.

Figure 6:
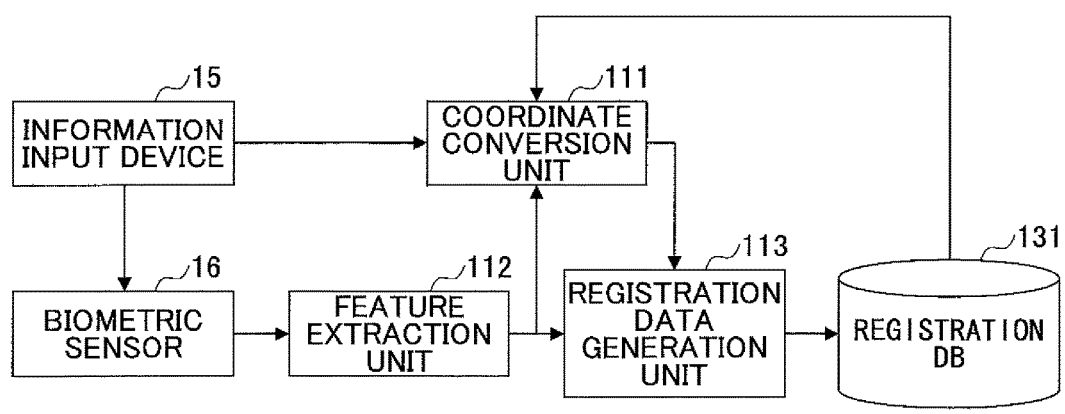
FIG. 6 is a functional block diagram for explaining an operation of the terminal apparatus in a first embodiment at a time of registering a vein pattern.

FIG. 6 is a functional block diagram for explaining an operation of the terminal apparatus in a first embodiment at the time of registering the vein pattern. In this example, at the time of registering the vein pattern, the image of the entire user's palm 900 is captured by the biometric sensor 16 or the other camera 6 in a state in which the user's palm 900 is placed at the position separated by the predetermined distance from the terminal apparatus 1, or by the apparatus other than the terminal apparatus 1. In this example, it is assumed for the sake of convenience that the captured image of the registration area 961 captured by the biometric sensor 16, that is, the vein pattern of the entire user's palm 900, is supplied to a feature extraction unit 112. The feature extraction unit 112 extracts the features of the vein pattern of the entire user's palm 900 by a known method, and supplies the extracted features to a registration data generation unit 113. The registration data generation unit 113 registers, in a registration database (hereinafter also referred to as "registration DB") 131, registration data including the features of the vein pattern of the registration area 961, as an example of the biometric data, and the coordinate value of this vein pattern in the coordinate system of the registration area 961, as registration data.

Next, when the user operates the information input device 15 by the user's finger, the coordinate value of the input operation position (for example, the touch position on the touchscreen panel 145) is detected and supplied to a coordinate conversion unit 111. The information input device 15 supplies a capturing trigger to the biometric sensor 16, simultaneously as when the coordinate value of the input operation position is detected. In response to the capturing trigger, the biometric sensor 16 captures the partial image of the capture area 161 of the user's palm 900 at the point in time when the coordinate value of the input operation position is detected, and supplies the captured partial image to the feature extraction unit 112. More particularly, the biometric sensor 16 captures the partial vein pattern of the capture area 161 of the user's palm 900 at the point in time when the coordinate value of the input operation position is detected, in response to the capturing trigger, and supplies the captured partial vein pattern to the feature extraction unit 112. The feature extraction unit 112 extracts the features of the captured partial vein pattern by a known method, and supplies the extracted features to the coordinate conversion unit 111. The registration data registered in the registration DB 131 is read from the registration DB 131 and supplied to the coordinate conversion unit 111.

The coordinate conversion unit 111 recognizes from the pattern matching described above that the features of the partial vein pattern of the capture area 161 captured by the biometric sensor 16 at the point in time when the coordinate value of the input operation position on the information input device 15 is (x, y) correspond to the partial vein pattern at the position 961A within the registration area 961. In other words, the coordinate conversion unit 11 can recognize that the coordinate value (x, y) of the input operation position on the information input device 15 corresponds to the coordinate value (X, Y) that is used as the reference of the registration area 961, based on the relative positional relationship that is uniquely determined between the coordinate value of the input operation position and the position of the biometric sensor 16. The coordinate value (X, Y) that is used as the reference of the registration area 961 is the coordinate value of the position 961A within the registration area 961. The coordinate conversion unit ill sets, within the coordinate conversion unit ill, the corresponding relationship between the coordinate value (x, y) of the input operation position on the information input device 15 and the coordinate value (x, Y) of the registration area 961. Hence, at the time of matching the vein patterns as will be described later, the coordinate conversion unit 111 can convert the coordinate system of the partial vein pattern of the capture area 161 into the coordinate system of the vein pattern of the entire user's palm 900 within the registration area 961, based on the corresponding relationship that is set.

Processes of the coordinate conversion unit 111, the feature extraction unit 112, and the registration data generation unit 113 may be executed by the CPU 11. In addition, the registration DB 131 may be included in the storage device 13, for example.

FIG. 7 is a flow chart for explaining the operation of the terminal apparatus in the first embodiment at the time of registering the vein pattern. The process illustrated in FIG. 7 can be executed by the CPU 11, for example. In step S1 illustrated in FIG. 7, the CPU 11 controls the biometric sensor 16, for example, and captures the user's palm 900 that is placed at the position separated by the predetermined distance from the terminal apparatus 1, by the biometric sensor 16. In addition, the CPU 11, in step S1, extracts the features of the vein pattern of the entire user's palm 900 within the registration area 961 captured by the biometric sensor, by a known method, and registers, in the registration DB 131, the registration data including the features of the vein pattern of the registration area 961, and the coordinate value of this vein pattern in the coordinate system of the registration area 961, as the registration data. When the user operates the information input device 15 by the user's finger, the CPU 11, in step S2, acquires the coordinate value of the input operation position detected by the information input device 15, and the partial vein pattern of the capture area 161 of the user's palm 900 captured by the biometric sensor 16 at the point in time when the coordinate value of the input operation position is detected. In step S3, the CPU 11 extracts the features of the partial vein pattern by a known method, and reads the registration data registered in the registration DB 131, to perform the pattern matching. More particularly, the CPU 11 recognizes, by the pattern matching, the position of the portion within the registration area 961 corresponding to the features of the partial vein pattern of the capture area 161 captured by the biometric sensor 16 at the point in time when the coordinate value of the input operation position is (x, y). In step S4, the CPU 11 recognizes that the coordinate value (x, y) of the input operation position on the information input device 15 corresponds to the coordinate value (X, Y) that is used as the reference of the registration area 961, based on the relative positional relationship that is uniquely determined between the coordinate value of the input operation position and the position of the biometric sensor 16. Further, the CPU 11, in step S4, sets the corresponding relationship between the coordinate value (x, y) of the input operation position on the information input device 15 and the coordinate value (X, Y) of the registration area 961.

FIG. 8 is a functional block diagram for explaining an operation of the terminal apparatus in the first embodiment at the time of matching vein patterns. In FIG. 8, those parts that are the same as those corresponding parts in FIG. 6 are designated by the same reference numerals, and a description thereof will be omitted. In FIG. 8, when the user operates the information input device 15 by the user's finger, the coordinate value of the input operation position (for example, the touch position on the touchscreen panel 145) is detected and supplied to the coordinate conversion unit 111. The information input device 15 supplies the capturing trigger to the biometric sensor 16, simultaneously as when the coordinate value of the input operation position is detected. In response to the capturing trigger, the biometric sensor 16 captures the partial vein pattern of the capture area 161 of the user's palm 900 at the point in time when the coordinate value of the input operation position is detected, and supplies the captured partial vein pattern to a feature extraction unit 112. The feature extraction unit 112 extracts the features of the captured partial vein pattern by a known method, and supplies the extracted features to a matching unit 114. The registration data registered in the registration DB 131 is read from the registration DB 131 and supplied to the matching unit 114.

At the time of registering the vein pattern, the coordinate conversion unit 111 is set with the corresponding relationship between the coordinate value (x, y) of the input operation position on the information input device 15 and the coordinate value (X, Y) of the registration area 961. Accordingly, at the time of matching the vein patterns, the coordinate conversion unit 111 can convert the coordinate system of the partial vein pattern of the capture area 161 captured by the biometric sensor 16 into the coordinate system of the vein pattern of the entire user's palm 900 within the registration area 961, based on the corresponding relationship that is set. The coordinate conversion unit 111 supplies to the matching unit 114 the coordinate value of the partial vein pattern of the capture area 161 originally in the coordinate system of the capture area 161 into the coordinate system of the vein pattern of the registration area 961.

Accordingly, based on the corresponding relationship that is set, the matching unit 114 can recognize that the features of the partial vein pattern of the capture area 161 captured by the biometric sensor 16 at the point in time when the coordinate value of the input operation position on the information input device 15 is (x, y), correspond to the features of the partial vein pattern at the position 961A amongst the features of the vein pattern of the registration area 961 included in the registration data read from the registration DB 131. The matching unit 114 matches the features of the captured partial vein pattern of the capture area 161 to the features of the partial vein pattern at the position 961A amongst the features of the vein pattern of the registration area 961, and computes a similarity with respect to the registered features. The matching unit 114 verifies the identity of the user himself when the computed similarity is greater than or equal to a threshold value, for example.

The matching unit 114 may match the features of a plurality of partial vein patterns to the registered features, and verify the identity of the user himself when an average value of a plurality of similarities computed for the features of the plurality of partial vein patterns is greater than or equal to the threshold value, for example.

Processes of the coordinate conversion unit 111, the feature extraction unit 112, and the matching unit 114 may be executed by the CPU 11.

FIG. 9 is a flow chart for explaining the operation of the terminal apparatus in the first embodiment at the time of matching the vein patterns. The process illustrated in FIG. 9 can be executed by the CPU 11, for example. In step S11 illustrated in FIG. 9, the CPU 11 acquires the coordinate value of the input operation position detected by the information input device 15, and the partial vein pattern of the capture area 161 of the user's palm 900 captured by the biometric sensor 16 at the point in time when the coordinate value of the input operation position is detected. In step S12, the CPU 11 converts the coordinate system of the partial vein pattern of the capture area 161 captured by the biometric sensor 16 into the coordinate system of the vein pattern of the entire user's palm 900 within the registration area 961, based on the corresponding relationship, which is set at the time of registering the vein pattern, between the coordinate value (x, y) of the input operation position on the information input device 15 and the coordinate value (X, Y) of the registration area 961. In step S13, the CPU 11 extracts the features of the partial vein pattern of the capture area 161 by a known method, and matches the features of the captured partial vein pattern of the capture area 161 to the features of the partial vein pattern at the position 961A amongst the features of the vein pattern of the registration area 961, using the coordinate value of the partial vein pattern of the capture area 161, originally in the coordinate system of the capture area 161 but converted into the coordinate system of the vein pattern of the registration area 961. In step S13, the CPU 11 also computes a similarity of the features of the captured partial vein pattern of the capture area 161 with respect to the registered features. In step S14, the CPU 11 verifies the identity of the user himself when the computed similarity is greater than or equal to the threshold value, for example.

The correspondence between the coordinate value of the input operation position on the information input device 15 and the coordinate value of the vein pattern of the registration area 961 can be determined according to a result of the input operation performed by the user at a single position on the information input device 15, or determined according to a result of the input operation performed by the user at a plurality of positions on the information input device 15. In a case in which the correspondence is determined according to the result of the input operation performed by the user at the plurality of positions on the information input device 15, i pairs of a coordinate value $(x_i, y_i)$ of the input operation position and a coordinate value $(X_i, Y_i)$ of the vein pattern of the registration area 961 can be obtained, where i=2, . . . , N, and N is a natural number greater than or equal to 2. However, in a case in which the two coordinate systems are represented by a simple corresponding relationship X=ax+b and Y=cy+d, where a, b, c, and d indicate coefficients, the correspondence may be determined by obtaining the coefficients a, b, c, and d by least squares approximation in order to minimize an error of the coordinate value detection. Alternatively, an optimum correspondence may be determined by extracting a candidate coordinate value for the correspondence by cross correlation, and applying dynamic programming.

In this embodiment, at the time of registering the vein pattern which is an example of the biometric information, the data coordinate value of the captured vein pattern, obtained by converting the coordinate value (or contact coordinate value) of the input operation position according to the corresponding relationship described above, and the features (or feature values) extracted from the vein pattern captured at this input operation position, are registered in the registration database as the registration data. On the other hand, at the time of matching the vein pattern which is the example of the biometric information, the positional relationship between the partial vein pattern captured at the time of the matching and the vein pattern included in the registration data is obtained, using the data coordinate value of the converted coordinate value of the input operation position as the reference. In addition, at the time of matching the vein pattern, the features of the partial vein pattern are matched to the features of the corresponding vein pattern within the registration data.

Accordingly, this embodiment is convenient particularly when performing the vein authentication on a portable terminal. In addition, in a case in which the partial authentication is applied to the vein authentication, it is possible to perform the vein authentication at a high speed with a high accuracy.

In other words, because the biometric authentication is performed simultaneously as when performing the operation on the information input device, it is possible to improve the function of the terminal apparatus and to improve safety of services utilized on the terminal apparatus. In addition, the position of the captured partial image with respect to the registered image is determined using the input operation position on the information input device and the corresponding relationship that is set in advance. The position of the captured partial image with respect to the registered image is not determined while scanning the entire area of the palm at the time of matching the biometric information while performing the pattern matching. For this reason, it is possible to reduce both the time required to determine the position of the captured partial image with respect to the registered image, and a possibility of an erroneous matching caused by fuzzy position determination, to enable the biometric authentication at the high speed with the high accuracy. Furthermore, because the biometric authentication is triggered by a simple input operation on the information input device without requiring the user to perform a special operation, the biometric information that is input becomes stable, to enable the biometric authentication to be performed with the high accuracy.

(Second Embodiment)

Figure 10:
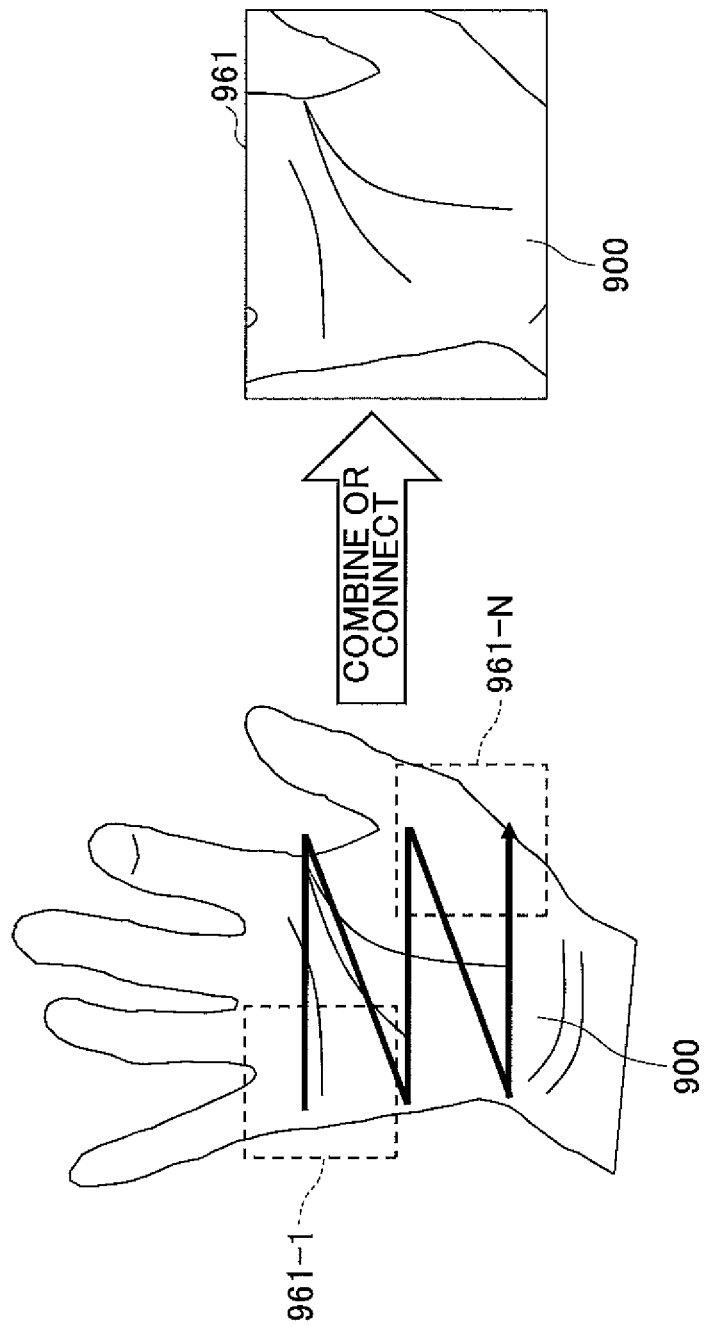
FIG. 10 is a diagram for explaining another example of the relationship between the coordinate value of the input operation position on the information input device and the coordinate value of the captured image captured by the biometric sensor.

FIG. 10 is a diagram for explaining another example of the relationship between the coordinate value of the input operation position on the information input device and the coordinate value of the captured image captured by the biometric sensor. FIG. 10 is a view of the user's palm 900 viewed from the side of the terminal apparatus 1, similarly as in the case illustrated in FIG. 4. In this example, at the time of registering the vein pattern, instead of capturing the entire user's palm 900, a plurality of partial images of the user's palm 900 are captured. The plurality of partial images of the user's palm 900 are combined or connected, to generate a single image corresponding to the entire user's palm 900. For example, in a case in which the user continuously slides the user's finger on the touchscreen panel 145 and the biometric sensor 16 simultaneously captures the vein pattern of the user's palm 900 while the user's finger slides on the touchscreen panel 145, as in the example illustrated in FIG. 3, it is possible to obtain a plurality of partial images that are time continuous (or time sequential). Hence, the plurality of partial images may be combined or connected by a known method, to acquire and include in the registration data the single image of a wider area and corresponding to the entire user's palm 900.

In this example, when the user continuously slides the user's finger in a zigzag shape on the touchscreen panel 145 as indicated by a bold solid arrow on the left side of FIG. 10, partial images of the user's palm 900 are captured at each of the touch positions within areas 961-1 through 961-N, where N is a natural number greater than or equal to 2. By combining or connecting the partial images captured within the areas 961-1 through 961-N, it is possible to generate a single image corresponding to the entire user's palm 900, equivalent to the image captured within the registration area 961, as illustrated on the right side of FIG. 10.

By the process of combining or connecting the partial images, the relative positional relationship of each of the partial images is determined, and thus, it is possible to determine the coordinate system of the next (or following) partial image using the coordinate system of the first partial image as the reference. The corresponding relationship of each of the coordinate values of the plurality of partial images that are captured and the coordinate value of the input operation position on the information input device 15 corresponding to each of the partial images can be set in the coordinate conversion unit 111 illustrated in FIG. 6. In this case, at the time of matching the vein patterns, the coordinate conversion unit ill can convert the coordinate system of the partial vein pattern of the capture area 161 into the coordinate system of the vein pattern of the entire users palm 900 within the registration area 961, based on the corresponding relationship that is set therein.

Figure 11:
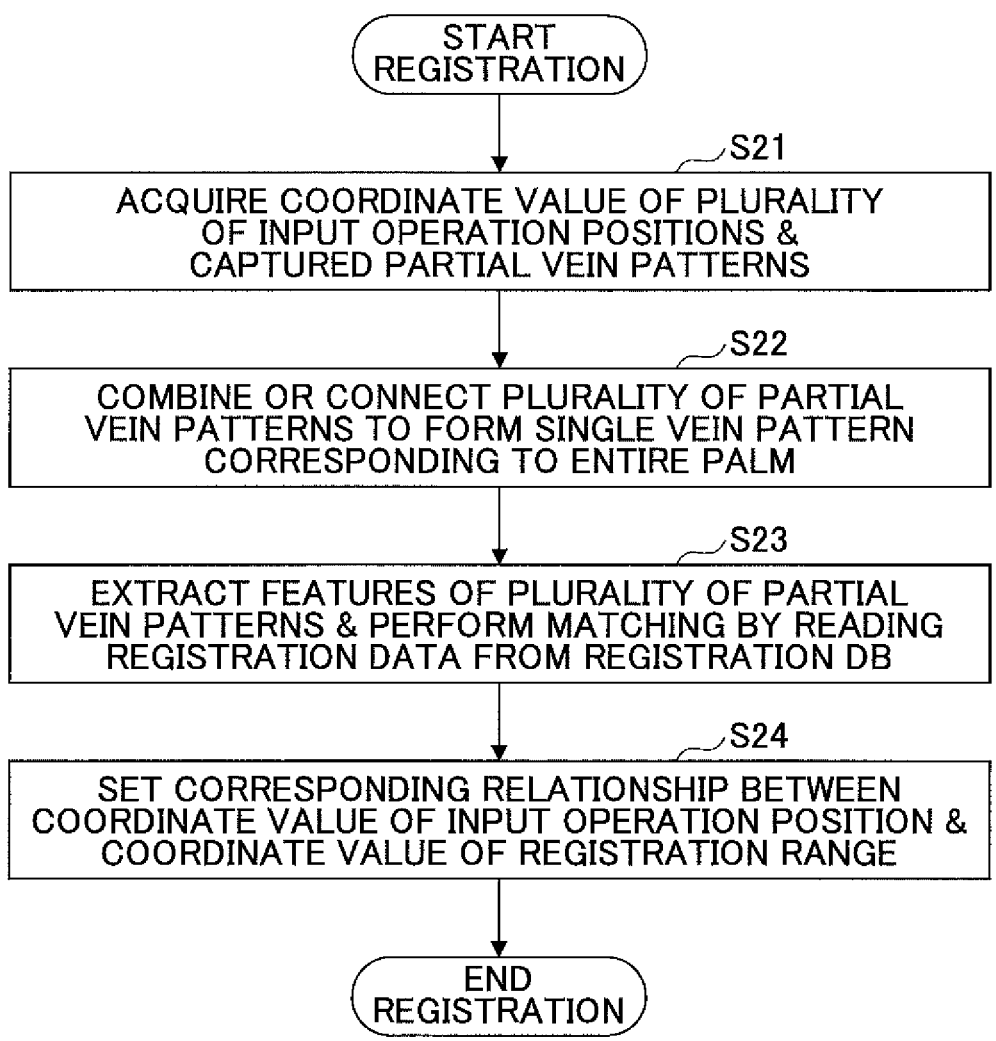
FIG. 11 is a flow chart for explaining the operation of the terminal apparatus in a second embodiment at the time of registering the vein pattern.

FIG. 11 is a flow chart for explaining the operation of the terminal apparatus in a second embodiment at the time of registering the vein pattern. The process illustrated in FIG. 11 can be executed by the CPU 11, for example. In step S21 illustrated in FIG. 11, the CPU 11 performs a control similar to that of the first embodiment described above at the time of matching the vein patterns. As a result, in step S21, the CPU 11 acquires the coordinate values of the plurality of input operation positions detected by the information input device 15, and the plurality of partial vein patterns of the plurality of areas 961-1 through 961-N of the user's palm 900 captured by the biometric sensor 16 at the times the coordinate values of the plurality of input operation positions are detected. In step S22, the CPU 11 combines or connects the plurality of partial vein patterns by a known method, and forms a single vein pattern corresponding to the entire user's palm 900. In addition, in step S22, the CPU 11 extracts, by a known method, the features of the single vein pattern that is formed, and registers the extracted features of the single vein pattern and the coordinate value of the vein pattern in the registration area 961, as registration data, in the registration DB 131. Furthermore, in step S22, the CPU 11 reads the registration data from the registration DB 131, and performs the pattern matching described above. More particularly, the CPU 11 recognizes, by the pattern matching, the positions of the partial vein patterns within the registration area 961 corresponding to the features of the partial vein patterns of the areas 961-1 through 961-N captured by the biometric sensor 16 at the points in time when the coordinate values of the input operation positions are $(x_1, y_1)$ through $(x_N, y_N)$. In step S24, the CPU 11 recognizes that the coordinate values $(x_1, y_1)$ through $(x_N, y_N)$ of the input operation positions on the information input device 15 correspond to the coordinate values $(X_1, Y_1)$ through $(X_N, Y_N)$ of the registration area 961 that are used as the reference, based on the relative positional relationship uniquely determined between the coordinate value of the input operation position and the position of the biometric sensor 16. Hence, in step S24, the CPU 11 sets the corresponding relationship between the coordinate value (x, y) of the input operation position on the information input device 15 and the coordinate value (X, Y) of the registration area 961.

The operation of the terminal apparatus in the second embodiment at the time of registering the vein pattern can be performed by the functional blocks illustrated in FIG. 6, in a manner similar to the first embodiment described above, and thus, a description thereof will be omitted. In this case, the process of step S22 can be executed by the feature extraction unit 112 and the registration data generation unit 113, for example.

The operation of the terminal apparatus in the second embodiment at the time of matching the vein patterns can be performed by the functional blocks illustrated in FIG. 8, in a manner similar to the first embodiment described above in conjunction with FIG. 9, and thus, a description thereof will be omitted. In this case, the second embodiment differs from the first embodiment in that the vein pattern corresponding to the entire user's palm 900, included in the registration data registered in the registration DB 131, is the single vein pattern that is formed by combining or connecting the plurality of partial vein patterns.

According to this embodiment, it is possible to obtain effects similar to those obtainable in the first embodiment. In addition, because a larger number of input operation are performed on the information input device at the time of registering the vein pattern than at the time of matching the vein patterns, it is possible to improve the acceptability with respect to fluctuation of the partial vein pattern to be matched, and to reduce the authentication failing rate when the identity verification is performed on the person himself (that is, decrease the FRR (False Rejection Rate)).

(Third Embodiment)

Next, a description will be given of a third embodiment. In the third embodiment, the coordinate value (or contact coordinate value) of the input operation position and the data coordinate value of the captured vein pattern are not made to strictly correspond to each other. At the time of registering the vein pattern, the contact coordinate value is registered in correspondence with the features of the partial vein pattern. At the time of matching the vein patterns, a reference is made to the features of the registered partial vein pattern closest to the contact coordinate value at the time when the biometric sensor captures the partial vein pattern to be matched, using the contact coordinate value of the registration data that is registered, and matches the features of the partial vein pattern to be matched to the referred features. In this case, the matching is performed while slightly shifting the position of the partial vein pattern to be matched, with respect to the registered partial vein pattern.

Figure 12:
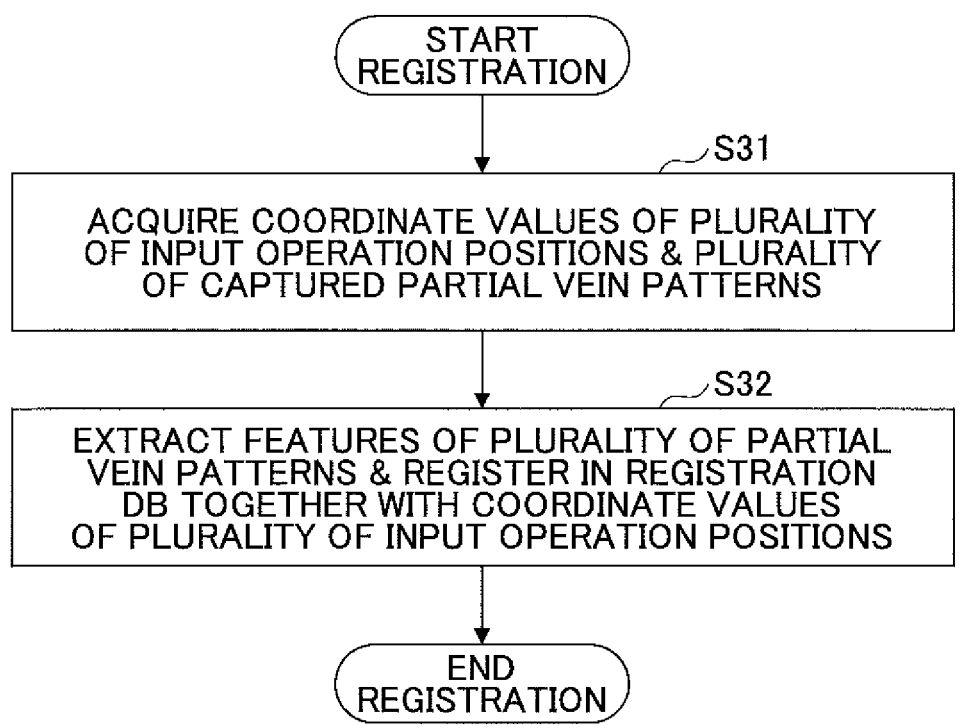
FIG. 12 is a flow chart for explaining the operation of the terminal apparatus in a third embodiment at the time of registering the vein pattern.

FIG. 12 is a flow chart for explaining the operation of the terminal apparatus in a third embodiment at the time of registering the vein pattern. The process illustrated in FIG. 12 can be executed by the CPU 11, for example. In step S31 illustrated in FIG. 12, the CPU 11 performs a control similar to that of the first embodiment described above at the time of matching the vein patterns. As a result, the CPU 11 acquires the coordinate values of the plurality of input operation positions detected by the information input device 15, and the plurality of partial vein patterns of the plurality of areas 961-1 through 961-N of the user's palm 900 captured by the biometric sensor 16 at the point in time when the coordinate values of the plurality of input operation positions are detected. In step S32, the CPU 11 extracts, by a known method, the features of the plurality of partial vein patterns, which are examples of the biometric data, for example. In addition, in step S32, the CPU 11 registers the extracted features of the partial vein patterns, and the coordinate values of the input operation positions where the partial vein patterns are captured, in the registration DB 131 as the registration data.

The operation of the terminal apparatus in the third embodiment at the time of registering the vein pattern can be performed by the functional blocks illustrated in FIG. 6, in a manner similar to the first embodiment described above, and thus, a description thereof will be omitted. In this case, the coordinate conversion unit 111 may be omitted, and the coordinate value of the input operation position detected by the information input device 15 can be supplied to the registration data generation unit 113, for example. In addition, the process of step S32 can be executed by the feature extraction unit 112 and the registration data generation unit 113, for example.

Figure 13:
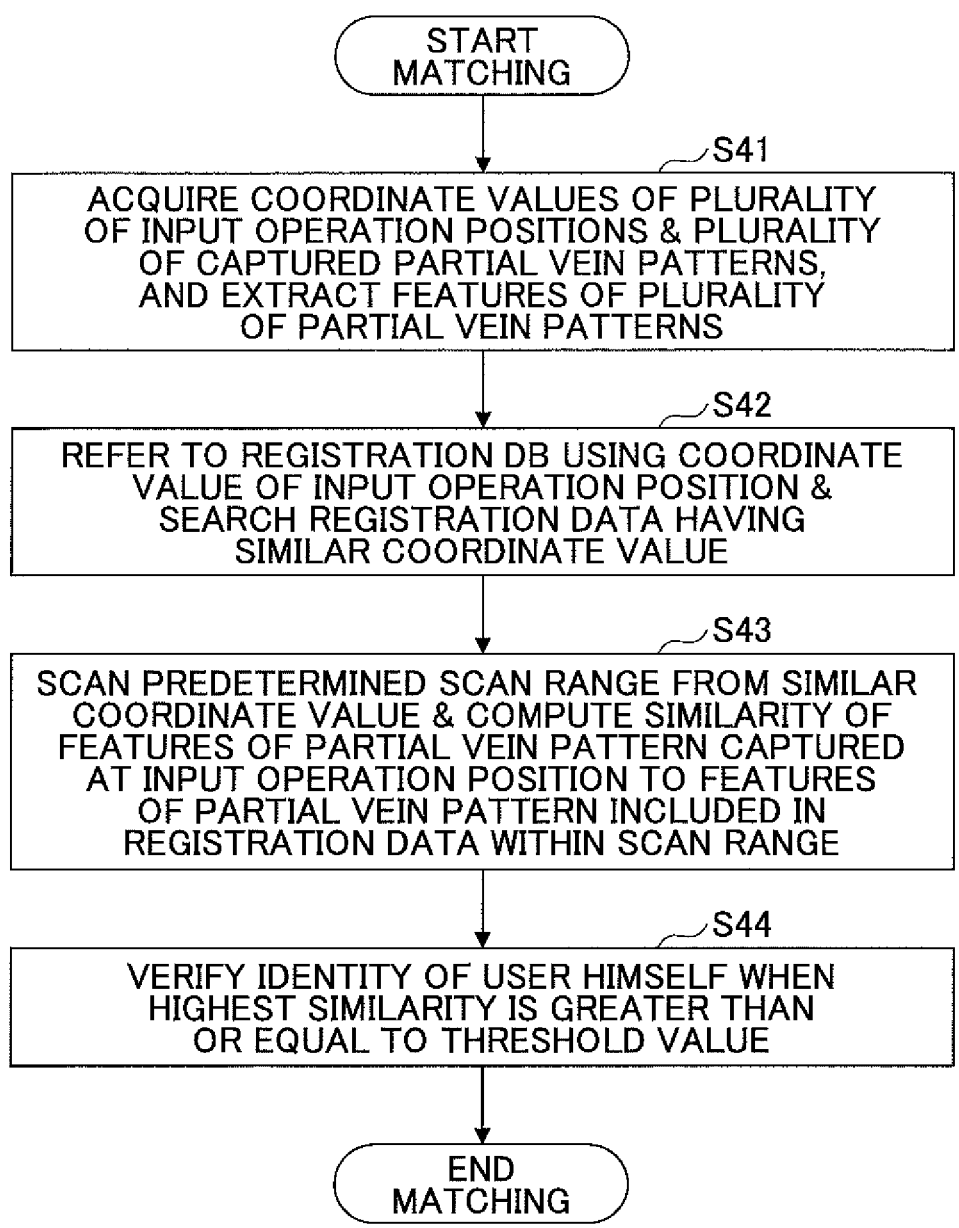
FIG. 13 is a flow chart for explaining the operation of the terminal apparatus in the third embodiment at the time of matching the vein patterns.

FIG. 13 is a flow chart for explaining the operation of the terminal apparatus in the third embodiment at the time of matching the vein patterns. The process illustrated in FIG. 13 can be executed by the CPU 11, for example. In step S41 illustrated in FIG. 13, the CPU 11 acquires the coordinate value of the input operation position detected by the information input device 15, and the partial vein pattern of the capture area 161 of the user's palm 900 captured by the biometric sensor 16 at the point in time when the coordinate value of the input operation position is detected, and extracts the features of the partial vein pattern by a known method. In step S42, the CPU 11 refers to the registration DB 131 using the coordinate value of the input operation position that is detected, and searches for the registration data having a similar coordinate value. In step S43, the CPU 11 scans a predetermined scan area from the similar coordinate value, and computes a similarity of the features of the partial vein pattern captured at the input operation position that is detected, with respect to the features of the partial vein pattern included in the registration data within the scan area. In step S44, the CPU 11 verifies the identity of the user himself when a highest computed similarity is greater than or equal to a threshold value, for example.

The operation of the terminal apparatus in the third embodiment at the time of matching the vein patterns can be performed by the functional blocks illustrated in FIG. 8, in a manner similar to the first embodiment described above, and thus, a description thereof will be omitted. In this case, the coordinate conversion unit 111 may be omitted, and the coordinate value of the input operation position detected by the information input device 15 can be supplied to the matching unit 114, for example. In this case, this embodiment differs from the first embodiment in that the registration DE 131 registers, as the registration data, the coordinate values of the input operation positions where the partial vein patterns are captured, in correspondence with the features of the plurality of partial vein patterns.

In the first and second embodiments described above, the matching may also be performed while slightly shifting the position of the partial vein pattern to be matched, with respect to the registered partial vein pattern, and find an optimum position where the similarity becomes a predetermined value or greater.

On the other hand, the third embodiment scans a scan area wider than the scan area scanned by the first and second embodiments. However, the area scanned in the third embodiment is narrow compared to a case in which the entire user's palm 900 is scanned, and thus, effects similar to those obtainable in the first and second embodiments can also be obtained by the third embodiment employing such a scan method.

(Modification)

Figure 14:
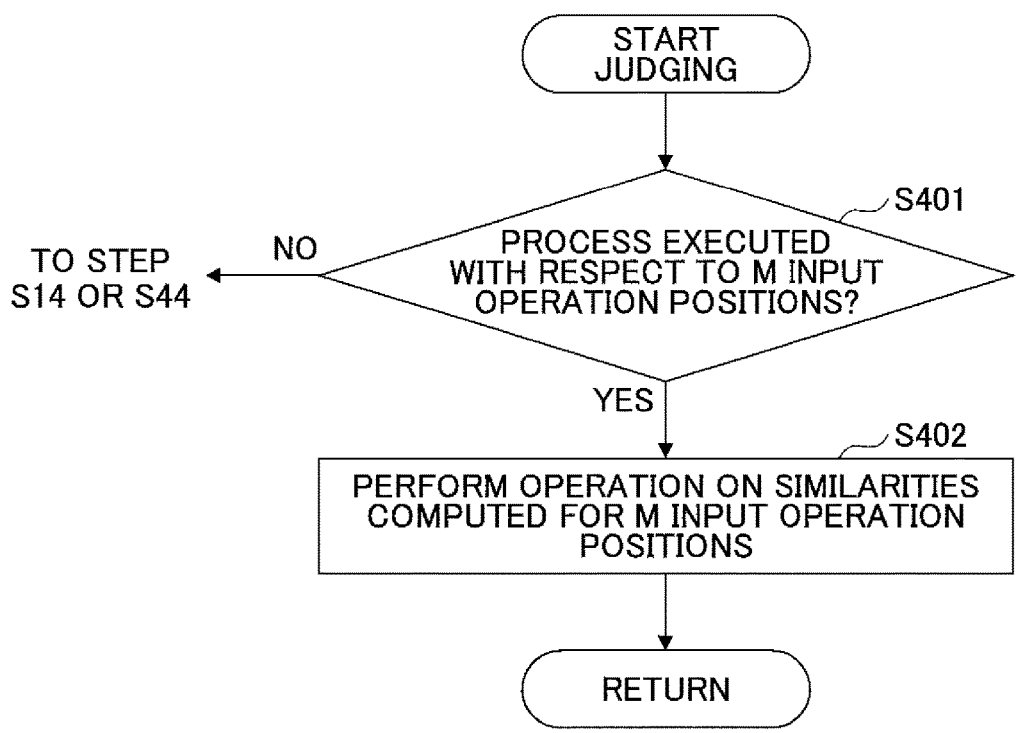
FIG. 14 is a flow chart for explaining the operation of the terminal apparatus in a modification at the time of matching the vein patterns.

FIG. 14 is a flow chart for explaining the operation of the terminal apparatus in a modification at the time of matching the vein patterns. The process illustrated in FIG. 14 can be executed by the CPU 11, for example, when executing the process of step S14 illustrated in FIG. 9, for example. In this modification, the matching process is performed according to a result of input operations performed by the user at M positions on the information input device 15, where M is a natural number greater than or equal to 2. In step S401 illustrated in FIG. 14, the CPU 11 judges whether the process of steps S11 through S14 illustrated in FIG. 9, for example, is executed with respect to N input operation positions. When a judgment result in step S401 is NO, the process returns to step S11 illustrated in FIG. 9. On the other hand, when the judgment result in step S401 is YES, the CPU 11, in step S14 illustrated in FIG. 9, verifies the identity of the user himself based on a value that is obtained by performing an operation on the similarity computed in step S13 illustrated in FIG. 9 for the N input operation positions, in step S402 illustrated in FIG. 14. In this case, the operation may obtain a maximum value of the computed similarities, obtain an average value of the computed similarities, or obtain a minimum value of the computed similarities.

Similarly, in step S401 illustrated in FIG. 14, the CPU 11 may judge whether the process of steps S41 through S44 illustrated in FIG. 13, for example, is executed with respect to the M input operation positions. When the judgment result in step S401 is NO, the process returns to step S41 illustrated in FIG. 13. On the other hand, when the judgment result in step S401 is YES, the CPU 11, in step S44 illustrated in FIG. 13, verifies the identity of the user himself based on a value that is obtained by performing an operation on the similarity computed in step S43 illustrated in FIG. 13 for the N input operation positions, in step S402 illustrated in FIG. 14. In this case, the operation may obtain a maximum value of the computed similarities, obtain an average value of the computed similarities, or obtain a minimum value of the computed similarities.

Compared to the biometric authentication according to the result of the input operation performed by the user at a single position on the information input device 15, the biometric authentication according to the result of the input operation performed at a plurality of positions on the information input device 15 can improve the authentication accuracy because it is possible to utilize the features of a larger number of vein patterns.

In each of the embodiments and modification described above, the biometric information used for the biometric authentication is the vein pattern of the user's palm. However, the biometric information may be a wrinkle pattern on the user's palm, a combination of the wrinkle pattern and the vein pattern of the user's palm, or the like.

In addition, the shape of the registration area that is captured at the time of registering the vein pattern is not limited to a rectangular shape, and may be a circular shape, an oval shape, or the like, for example. The shape of the registration area may be appropriately selected according to the biometric sensor or camera used at the time of the registration. Similarly, the shape of the capture area captured at the time of matching the vein pattern is not limited to a rectangular shape, and may be a circular shape, an oval shape, or the like, for example. The shape of the capture area may be appropriately selected according to the biometric sensor used at the time of matching the vein patterns.

In each of the embodiments and modification described above, the biometric data included in the registration data registered in the registration database are the features of the biometric information, more particularly, the features of the vein patterns. For this reason, compared to a case in which the biometric data included in the registration data are biometric information such as vein images or the like, it is possible to reduce the amount of data to be registered. However, the biometric data included in the registration data may be biometric information, more particularly, vein images. In this case, the biometric data that are compared at the time of matching may be vein images or features (or feature values) extracted from the vein images. Comparing the features of the biometric information can reduce the matching time when compared to comparing the biometric information, such as the vein images or the like, at the time of the matching. Furthermore, the biometric data included in the registration data registered in the registration database may be biometric information, such as vein images or the like, or both the biometric information and the features thereof.

Of course, the registration data may be subjected to a process such as compression, enciphering, or the like when being registered in the registration database.

According to the embodiments described above, it is possible to perform a vein authentication at a high speed in a case in which the partial authentication is applied to the vein authentication.

The description above use terms such as "determine", or the like to describe the embodiments, however, such terms are abstractions of the actual operations that are performed. Hence, the actual operations that correspond to such terms may vary depending on the implementation, as is obvious to those skilled in the art.

Although the embodiments are numbered with, for example, "first," "second," or "third," the ordinal numbers do not imply priorities of the embodiments. Many other variations and modifications will be apparent to those skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A terminal apparatus comprising:
    a touchscreen panel integrally including a display device and an information input device that detects a coordinate value of an input operation position on the touchscreen panel touched by a user;
    a biometric sensor that captures a capture area of a palm of the user at a time of an input operation to an input operation position on the touchscreen panel by a finger of the user, to generate biometric data; and
    a processor that performs a process including
        matching the biometric data to a corresponding portion of registered biometric data registered in advance and read based on the coordinate value, to compute a similarity of the biometric data to the corresponding portion,
    wherein the touchscreen panel and the biometric sensor are arranged at relative positions so that at least a portion of the palm of the user is captured by the biometric sensor when the user touches any input operation position on the touchscreen panel by the finger of the user, wherein
    the process further includes setting a corresponding relationship for converting a first coordinate system on the touchscreen panel into a second coordinate system of the registered biometric data,
    the terminal apparatus further comprises:
        a registration database including the registered biometric data of the palm of the user captured in a registration area wider than the capture area, and a coordinate value of the registered biometric data in the second coordinate system, and
    the matching recognizes a coordinate value of the corresponding portion of the registered biometric data in the second coordinate system, from the coordinate value at a point in time when the biometric data is captured, converted from the first coordinate system into the second coordinate system based on the corresponding relationship, and reads the corresponding portion from the registration database.

2. The terminal apparatus as claimed in claim 1, wherein the setting includes receiving the biometric data, the coordinate value in the first coordinate system at the point in time when the biometric data is captured, and the coordinate value of the registered biometric data in the second coordinate system, to set the corresponding relationship between the coordinate value in the first coordinate system and the coordinate value of the registered biometric data in the second coordinate system.

3. The terminal apparatus as claimed in claim 1, wherein
    the process further includes extracting features of a biometric image captured by the biometric sensor, to output the biometric data, and
    the matching matches the features of the biometric image to a corresponding portion of features of the registered biometric image included in the registered biometric data.

4. The terminal apparatus as claimed in claim 1, wherein the biometric sensor captures the capture area of the palm in response to the information input device detecting the input operation position on the touchscreen panel touched by the finger of the user.

5. The terminal apparatus as claimed in claim 1,
    wherein the biometric sensor captures an area of the palm at a plurality of touch positions on the touchscreen panel, simultaneously as when the finger of the user continuously slides on the touchscreen panel, and
    wherein the plurality of touch positions are selected from a group consisting of positions where the finger of the user sliding on the touchscreen panel stops for a predetermined time or longer, positions sampled at predetermined sampling times or intervals while the finger of the user slides on the touchscreen panel, and positions after the finger of the user slides a predetermined distance on the touchscreen panel.

6. The terminal apparatus as claimed in claim 5, wherein the matching performs a partial matching of features of the area of the palm captured by the biometric sensor at each of the plurality of touch positions to each corresponding portion of the registered biometric data.

7. A non-transitory computer-readable storage medium having stored therein a program for causing a computer to execute a process comprising:
    acquiring a coordinate value of an input operation position on a touchscreen panel touched by a finger of a user, detected by an information input device, and biometric data of a capture area of a palm of the user captured by a biometric sensor at a time of an input operation to the input operation position on the touchscreen panel by the finger of the user, wherein the touchscreen panel integrally includes a display device and the information input device; and matching the biometric data to a corresponding portion of registered biometric data registered in advance and read based on the coordinate value, to compute a similarity of the biometric data to the corresponding portion, wherein the touchscreen panel and the biometric sensor are arranged at relative positions so that at least a portion of the palm of the user is captured by the biometric sensor when the user touches any input operation position on the touchscreen panel by the finger of the user, wherein the process further comprises:

setting a corresponding relationship for converting a first coordinate system on the touchscreen panel into a second coordinate system of the registered biometric data, wherein the matching recognizes a coordinate value of the corresponding portion of the registered biometric data in a second coordinate system, from the coordinate value at a point in time when the biometric data is captured, converted from a first coordinate system into the second coordinate system based on the corresponding relationship, and reads the corresponding portion from a registration database including the registered biometric data of the palm of the user captured in a registration area wider than the capture area, and a coordinate value of the registered biometric data in the second coordinate system.

8. The non-transitory computer-readable storage medium as claimed in claim 7, wherein the setting includes receiving the biometric data, the coordinate value in the first coordinate system at the point in time when the biometric data is captured, and the coordinate value of the registered biometric data in the second coordinate system, to set the corresponding relationship between the coordinate value in the first coordinate system and the coordinate value of the registered biometric data in the second coordinate system.

9. The non-transitory computer-readable storage medium as claimed in claim 7, wherein the acquiring acquires the biometric data of the capture area of the palm captured by the biometric sensor in response to the information input device detecting the input operation position on the touchscreen panel touched by the finger of the user.

10. The non-transitory computer-readable storage medium as claimed in claim 7, wherein the acquiring acquires biometric data of an area of the palm captured by the biometric sensor captures at a plurality of touch positions on the touchscreen panel, simultaneously as when the finger of the user continuously slides on the touchscreen panel, and wherein the plurality of touch positions are selected from a group consisting of positions where the finger of the user sliding on the touchscreen panel stops for a predetermined time or longer, positions sampled at predetermined sampling times or intervals while the finger of the user slides on the touchscreen panel, and positions after the finger of the user slides a predetermined distance on the touchscreen panel.

11. The non-transitory computer-readable storage medium as claimed in claim 10, wherein the matching performs a partial matching of features of the area of the palm captured by the biometric sensor at each of the plurality of touch positions to each corresponding portion of the registered biometric data.

12. A biometric authentication method comprising:

detecting, by an information input device, a coordinate value of an input operation position on a touchscreen panel touched by a finger of a user;

capturing, by a biometric sensor, a capture area of a palm of the user at a time of an input operation to the input operation position on the touchscreen panel by the finger of the user, wherein the touchscreen panel integrally includes a display device and the information input device, to generate biometric data; and matching, by a processor, the biometric data to a corresponding portion of registered biometric data registered in advance and read based on the coordinate value, to compute a similarity of the biometric data to the corresponding portion, wherein the touchscreen panel and the biometric sensor are arranged at relative positions so that at least a portion of the palm of the user is captured by the biometric sensor when the user touches any input operation position on the touchscreen panel by the finger of the user, wherein the method further comprises:

setting, by the processor, a corresponding relationship for converting a first coordinate system on the touchscreen panel into a second coordinate system of the registered biometric data, wherein the matching recognizes a coordinate value of the corresponding portion of the registered biometric data in a second coordinate system, from the coordinate value at a point in time when the biometric data is captured, converted from a first coordinate system into the second coordinate system based on the corresponding relationship, and reads the corresponding portion from a registration database including the registered biometric data of the palm of the user captured in a registration area wider than the capture area, and a coordinate value of the registered biometric data in the second coordinate system.

13. The biometric authentication method as claimed in claim 12, wherein the setting includes receiving the biometric data, the coordinate value in the first coordinate system at the point in time when the biometric data is captured, and the coordinate value of the registered biometric data in the second coordinate system, to set the corresponding relationship between the coordinate value in the first coordinate system and the coordinate value of the registered biometric data in the second coordinate system.

14. The biometric authentication method as claimed in claim 12, wherein the capturing captures, by the biometric sensor, the capture area of the palm in response to the information input device detecting the input operation position on the touchscreen panel touched by the finger of the user.

15. The biometric authentication method as claimed in claim 12, wherein the capturing captures, by the biometric sensor, an area of the palm at a plurality of touch positions on the touchscreen panel, simultaneously as when the finger of the user continuously slides on the touchscreen panel, and wherein the plurality of touch positions are selected from a group consisting of positions where the finger of the user sliding on the touchscreen panel stops for a predetermined time or longer, positions sampled at predetermined sampling times or intervals while the finger of the user slides on the touchscreen panel, and positions after the finger of the user slides a predetermined distance on the touchscreen panel.

16. The biometric authentication method as claimed in claim 15, wherein the matching performs, by the processor, a partial matching of features of the area of the palm captured by the biometric sensor at each of the plurality of touch positions to each corresponding portion of the registered biometric data.

* * * * *